May 3, 1938.  O. M. URBAIN ET AL  2,116,053
PROCESS FOR THE PURIFICATION OF ORGANICALLY POLLUTED WATER
Filed Nov. 13, 1935
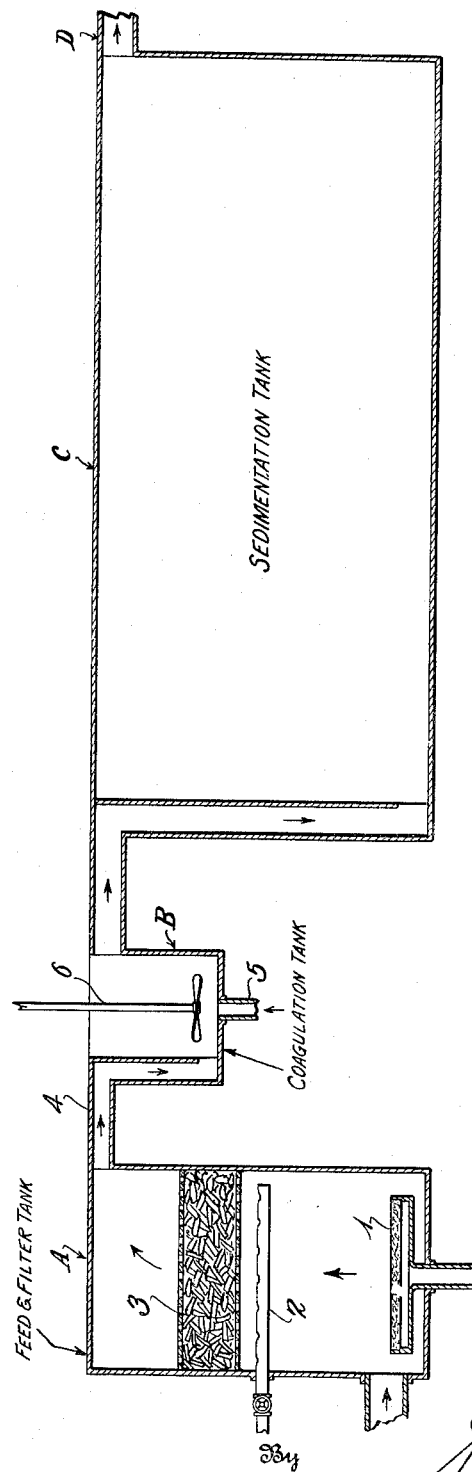
Inventors
Oliver M. Urbain
and William R. Stemen
James P. Burns
Attorney Patented May 3, 1938

2,116,053

UNITED STATES PATENT OFFICE 2,116,053

PROCESS FOR THE PURIFICATION OF ORGANICALLY POLLUTED WATER

Oliver M. Urbain and William R. Stemen, Columbus, Ohio, assignors to Charles H. Lewis, Harpster, Ohio Application November 13, 1935, Serial No. 49,614

7 Claims. (Cl. 210—2)

This invention relates to a process for the purification of organically polluted water. It is the purpose of the invention to provide a process that can be more economically operated than presently employed processes; to provide a process that will give markedly improved results and a process that requires a much shorter time period of treatment than purification processes currently employed.

In one of its more specific aspects the invention contemplates the treatment of domestic sewage or the like by generating ferric chloride in situ with accompanying oxidation of the sewage.

Certain rather elemental reactions are availed of in carrying out the process but these are employed in such relationship and in such combination that wholly new results are obtained.

To the end that the mechanics of the process may be made clear we will refer briefly to these recognized reactions and then point out the advantageous manner in which they are employed in the process.

It has long been known that chlorine will react with a metal to form a salt. This reaction is expressed by equation number 1 in the table of equations which follows.

Hydrochloric acid will react with iron to form a salt. The reaction is expressed by equation number 2.

Iron and iron oxides catalyze the decomposition of hypochlorous acid. This decomposition is expressed by equation number 3.

Chlorine will attack and react with iron to form ferric chloride.

The actions described have been employed in the preparation of ferric chloride. The process of preparing ferric chloride by the action of chlorine on iron is known as the Scott-Darcey process. It consists essentially of passing chlorine water of controlled strength upward through a mass of scrap iron. Chlorine water is a solution which contains chlorine, hydrochloric acid and hypochlorous acid. The HCl and HOCl are formed by the reaction of chlorine with water. The reaction is expressed by equation number 4. This equation is in equilibrium only when no HCl or HOCl is removed. When either of these are removed in whole, or in part, the reaction proceeds to the right until equilibrium is again established.

In the presence of an oxidizing mixture, such as chlorine and HOCl, ferrous chloride (FeCl$_2$) is oxidized to ferric chloride, (FeCl$_3$). The reaction is expressed by equation number 5. If we pass air through this mixture of iron and chlorine water and the products formed, as expressed by the first five equations, the iron is oxidized by a different agent, namely, by the oxygen of the air passed through the mixture. Thus we have the iron being oxidized, as shown in equations numbers 6 and 7. The iron oxides, shown in these equations, are, of course, hydrated, and they will react with HCl as expressed in equations numbers 8 and 9. Equations 1, 2, 5, 6 and 7 show the iron being oxidized. This is most important, as it should be particularly noted that the valence of the iron is elevated from zero to 2, and then from 2 to 3, i. e., three complete units of valence. Equation number 3 shows the liberation of active oxygen, a factor of some importance in the process, as this oxygen is in the nascent form.

*Table of equations*

Equation No. 1_____ $2Fe + 3Cl_2 \rightarrow 2FeCl_3$
Equation No. 2_____ $Fe + 2HCl \rightarrow FeCl_2 + H_2$
Equation No. 3_____ $2HOCl \rightarrow 2HCl + O_2$
Equation No. 4_____ $Cl_2 + H_2O \rightarrow HCl + HOCl$
Equation No. 5_____ $2FeCl_2 + Cl_2 \rightarrow 2FeCl_3$
Equation No. 6_____ $2Fe + O_2 \rightarrow 2FeO$
Equation No. 7_____ $4FeO + O_2 \rightarrow 2Fe_2O_3$
Equation No. 8_____ $FeO + 2HCl \rightarrow FeCl_2 + H_2O$
Equation No. 9_____ $Fe_2O_3 + 6HCl \rightarrow 2FeCl_3 + 3H_2O$ In this process the ferric chloride is prepared directly in situ in the sewage and serves both as a desolvator and as a coagulant and, as a result, we obtain the many beneficial actions hereinafter described.

The description of the process is simplified by reference to the accompanying diagrammatic drawing illustrating the course of the organically polluted water through the treating zones.

Referring to the drawing the general flow of the water to be treated is as follows:

It enters at the bottom of the oxidation tank A, overflows from the top of the oxidation tank and enters the coagulation tank B, and, after coagulation, enters the settling zone C. The effluents are discharged from the zone C at D.

As the polluted liquid for example sewage or the like passes upward in the tank A, diffused air is passed into the solution from the filtros plates located in the bottom of the tank. Chlorine is passed into the solution through line 2 at a point just below the bed of scrap iron 3. All the reactions take place simultaneously within the zone occupied by the iron. Sufficient air is provided to always maintain a positive oxygen balance in the oxidation tank A. Sufficient chlorine is passed into the solution to provide at least 200 p. p. m. of ferric chloride in the oxidation zone above the bed of iron. These balances are easily maintained, and are necessary. The rate of flow of the sewage through the oxidation tank will depend upon the rate of formation of ferric chloride. Generally speaking, a twenty minute period of contact will be found sufficient to complete all the reactions in this tank.

The solution next flows through line 4 and enters the coagulation zone or tank B. It is here treated with sufficient hydrated lime which is forced into the solution through line 5 at the bottom of the tank B to insure the maintenance of a pH of around pH 9.5. The material is agitated by means of a suitable agitator 6. A time period of from one to five minutes is sufficient for all actions occurring in the coagulation tank B.

From the coagulation zone B the material under treatment next passes through conduit 7 into the sedimentation tank C.

This tank C may be designed along conventional lines, with proper sludge facilities, baffles, etc. A detention period of two hours in this zone is ample.

We come, now, to the reasons for the use of the agents employed in this process and the manner in which they are employed.

The chlorine is employed to effect the rapid oxidation of the iron with the formation of the necessary content of ferric chloride. The chlorine also sterilizes the sewage and produces in its reaction with the water some nascent oxygen, both relatively important factors. By thus accelerating the oxidation step the oxidation period for the polluted liquid is reduced to less than 30 minutes as against approximately 6 hours for the currently employed activated sludge process. The reason for this accelerated oxidation is that as the iron is being oxidized three units in valence it carries along the oxidation of the sewage constituents. The pronounced success of this process is we believe due to this discovery. The ferric chloride formed performs two functions, first, it acts as a desolvator for the emulsoids and then the remaining excess ferric chloride functions as a coagulant in the coagulation tank after the addition of the calcium hydroxide to raise the solution to pH 9.5. Part of the ferric chloride hydrolyzes to form an hydrous oxide which desolvates the emulsoids. In the coagulation tank sufficient calcium chloride, ($CaCl_2$), is formed and functions as the electrolyte which flocculates the desolvated emulsoids and other colloids. The purpose of introducing the chlorine just below the iron in the first treatment tank is to prevent the waste of chlorine in satisfying the chlorine demand of the sewage. The oxidation can be effected with atmospheric oxygen which is a much cheaper oxidizing agent than chlorine.

Among the advantages of this process may be listed the following:

1. It provides cheap and efficient method of preparing ferric chloride in situ to act both as a desolvator and as a coagulant.
2. It permits taking advantage of the powerful oxidation set-up of chlorine plus iron, plus oxygen, plus water.
3. Iron and iron oxides catalyze the liberation of nascent oxygen from hypochlorous acid and this oxygen is available for the oxidation of the sewage constituents.
4. Use of air keeps the surface of the iron free of ferric chloride thus increasing the rate of formation of ferric chloride.

As a further feature of our invention, we have found that soluble manganese and soluble chromium salts will catalyze the oxidation of organic polluting constituents in the presence of ferric salts, such as ferric chloride. In our process these salts may be advantageously introduced into the oxidation tank A in a concentration of about five pounds per million gallons.

In comparing this process with the activated sludge process we find that the activated sludge process makes a reduction in B. O. D. (biochemical oxygen demand) of about 75%, B. coli about 25%, oxidation period of about 6 hours, cost of treatment from $25 to $125 per million gallons. The process of the instant invention will effect a reduction of approximately 98% in B. O. D., 100% reduction in B. coli, and has an oxidation period of around 30 minutes, and a cost of treatment not substantially exceeding $10 per million gallons treated.

What we claim as our invention is:

1. A process for the purification of organically polluted liquids comprising passing the liquid through a bed of scrap iron, introducing chlorine and diffused air to pass simultaneously with the liquid through the bed of iron forming ferric chloride in situ, and thereafter treating the resultant liquid with hydrated lime and passing the treated liquid to a settling zone.

2. A process for the purification of organically polluted liquid comprising subjecting the same to the simultaneous action of chlorine and diffused air in the presence of metallic iron, thereby forming ferric chloride in situ.

3. A process for the purification of organically polluted liquid comprising subjecting the same to the simultaneous action of chlorine and air in the presence of iron to form ferric chloride in situ, and thereafter raising the pH of the solution to approximately pH 9.5 and delivering the same to a suitable sedimentation zone.

4. A process for the purification of organically polluted liquid comprising subjecting the same to the simultaneous action of chlorine and air in the presence of iron to form ferric chloride in situ, and facilitating oxidation of the polluting organic constituents by introducing a catalyst into the liquid simultaneously with the chlorine and the air.

5. A process for the purification of organically polluted liquid comprising subjecting the same to the simultaneous action of chlorine and air in the presence of iron to form ferric chloride in situ, and facilitating oxidation of the polluting organic constituents by introducing into the liquid simultaneously with the chlorine and the air, a catalyst, selected from the group including soluble manganese and chromium salts.

6. A process for the purification of organically polluted liquids comprising adding chlorine and diffused air to said liquid and immediately passing the mixture through a bed of scrap iron to effect induced oxidation.

7. A process for the purification of organically polluted liquids comprising adding chlorine and diffused air to said liquid and passing said liquid containing chlorine and diffused air through a bed of metallic iron.

OLIVER M. URBAIN.
WILLIAM R. STEMEN.